United States Patent [19]

Schmidt et al.

[11] 4,185,068
[45] Jan. 22, 1980

[54] PROCESS FOR PREPARING A WEB OF FILM PRIOR TO WINDING IT INTO A WOUND ROLL

[75] Inventors: Willi J. Schmidt, Taunusstein; Norbert Roth, Ingelheim, both of Fed. Rep. of Germany

[73] Assignee: Hoechst Aktiengesellschaft, Fed. Rep. of Germany

[21] Appl. No.: 902,372

[22] Filed: May 3, 1978

Related U.S. Application Data

[63] Continuation-in-part of Ser. No. 865,547, Dec. 29, 1977, abandoned, which is a continuation of Ser. No. 502,911, Sep. 4, 1974, abandoned.

[30] Foreign Application Priority Data

Sep. 5, 1973 [DE] Fed. Rep. of Germany ....... 2344679

[51] Int. Cl.$^2$ .............................................. B29D 7/20
[52] U.S. Cl. .................... 264/284; 264/146; 264/235; 264/293; 264/346
[58] Field of Search ............... 264/284, 289, 288, 293, 264/145–147, 235, 346, 342

[56] References Cited

U.S. PATENT DOCUMENTS

| | | | |
|---|---|---|---|
| 2,074,732 | 3/1937 | Nelson | 264/148 |
| 2,976,567 | 3/1961 | Jones et al. | 264/284 |
| 3,060,515 | 10/1962 | Corbett | 264/284 |
| 3,254,148 | 5/1966 | Nichols | 264/289 |
| 3,261,903 | 7/1966 | Carr | 264/289 |
| 3,502,765 | 3/1970 | Spencer | 264/284 |
| 3,842,152 | 10/1974 | Witfield et al. | 264/210 R |

*Primary Examiner*—Jeffery R. Thurlow
*Attorney, Agent, or Firm*—James E. Bryan

[57] ABSTRACT

This invention relates to a process for continuously preparing a web of thermoplastic flat film for a subsequent winding operation, by providing it with embossed lines, preferably one line along each edge or very near each edge of the web, which process comprises embossing the lines while the film web is in a thermal state in which the tensioned film may be easily embossed, and is tensioned in all directions without undergoing a stretching operation effecting a dimensional change of the film web, and then cooling the embossed web of film.

11 Claims, No Drawings

PROCESS FOR PREPARING A WEB OF FILM PRIOR TO WINDING IT INTO A WOUND ROLL

This application is a continuation-in-part of application Ser. No. 865,547, filed Dec. 29, 1977 now abandoned, in turn a continuation of application Ser. No. 502,911, filed Sept. 4, 1974, and now abandoned.

The present invention relates to a process for preparing a web of thermoplastic flat film for a subsequent winding operation in which a line is embossed in a flat web of material. The line serves as a spacer between the individual layers of the wound roll and thus ensures that the layers of the roll do not contact each other and that the good planarity of the web of material produced during the manufacture thereof is retained in the wound roll even over a prolonged period of time.

It already has been proposed to provide the edge zones of a web of film with a trace, for example a so-called "cording", which is produced by means of a drum or roller covered with spikes and counteracting with a counter-drum or counter-roller. After its manufacture and after leaving the machine, the cold web is passed through this pair of rollers and the rollers are pressed upon one another with a force which is sufficient to cause the film material to be displaced by the spikes forced into it so that small mounds are formed. Depending upon the thickness of the film, the shape of the spikes and the pressure applied, these mounds project somewhat from the plane of the material and thus form deliberately produced thicker areas which, by being constantly superimposed, determine the diameter of the wound roll and cause the individual layers to be slightly spaced from each other in the area lying between the embossed lines, which are preferably arranged along the edges. In this manner, the surfaces of the films are generally protected, because over most of the area the surfaces of the individual layers are no longer in contact with each other.

This treatment of the web of material, which is part of the prior art, has the disadvantage that, by the individually slight, but as a whole distinctly noticeable displacement of the film material, it produces a certain expanding effect, similar to the chasing of a copper sheet into an arched form, which causes a wavy distortion of the treated edges. This deviation from the planarity of the film is completely unacceptable in the case of high quality films, for example films which are to be used as supporting materials for photographic and reprographic products or for drawing materials, because the quality of the finished products is substantially determined by the planarity of the material.

Further, it is known from Belgian Pat. No. 764,289, to produce a definite distance between the individual windings of a roll by applying a foreign substance, for example a wax mixture, to the desired area prior to the winding operation, thus producing an area of a controlled thickness. This process does not result in the adverse distortion of the film web, but it involves the risk that, when the web is unwound afterwards for further processing, particles of the foreign substance may split-off and get into the useful area of the film, which may give rise to coating defects and the like. Therefore, wound rolls of this type must be carefully observed during their further processing. Of course, the application of the wax mixture increases the manufacturing costs of these rolls.

Further, it is known from French Pat. No. 2,110,951, to prevent the blocking of webs of materials by winding strips or threads having a different coefficient of friction between the layers of the material during the winding-up process. This process which is not aimed at maintaining the planarity of a wound web of film, has the disadvantage that it involves considerable additional expenses for the strips and for the winding-off and winding-up installations, that these installations must be constantly observed because the rolls are not replaced at the same intervals as ordinary rolls, and that suitable strips for insertion must be constantly provided.

According to a last group of known processes, desired areas of thicker cross-section in the web are prepared by appropriately preforming the base film at the die orifice. This process has also some distinct disadvantages. The somewhat thicker bands within the web of material must pass with the web through different stretching processes during further processing of the material, and it was found that they adversely affect the uniform temperature distribution in the material, that the bands are prone to irregular lateral migration and thus are not superimposed when the web is subsequently wound up, and that, due to several physical causes, the stretching processes create a disproportionate amplification effect of positive and negative deviations from the normal profile which are not exactly controllable. With these processes, a specific arrangement of the bands in the web cannot be repeated, so that it is impossible to produce wound rolls of uniform construction by these processes.

It is the object of the present invention to provide a technically relatively simple process by which a web of flat film is provided with embossed lines in a manner such that the good planarity of the film web produced during its manufacture is not impaired, but is retained even if the web is stored in the wound state over a relatively long period of time.

This object is achieved by a process for preparing an extruded web of flat thermoplastic film for a subsequent winding operation, by providing it with embossed lines along the edges or very close to the edges of the web. The embossed lines are applied to a web of base film while in the ductile state while the fil is tensioned in all directions without undergoing a stretching operation effecting a dimensional change of the film; the embossed film is then cooled, preferably to room temperature, for example by passing it for a sufficiently long period of time through air at room temperature.

Preferably after being embossed and before being cooled, the film is subjected to a thermal treatment, for example by appropriately heating the film by means of an infrared radiator, while the film is still tensioned in all directions without undergoing a stretching operation effecting a dimensional change of the film.

The expression "base film composed of synthetic polymer material" includes synthetic thermoplastic polymers and synthetic elastomers.

The expression "tensioned in all directions without undergoing a stretching operation effecting a dimensional change of the film" means that this operation does not result in a stretch-orientation as the result of which the film web is changed in its dimensions.

For the purpose of tensioning the film in all directions without causing a stretching operation effecting a dimensional change of the film, the edges of the film may be held, for example in revolving clip chains, by belts, or similar known means.

The process may be carried out continuously.

The application of forces to the edges of the film in order to transversely tension it in accordance with the definition given above, does not act as an embossing operation in the sense of the present invention.

During the process, the web of film is fed in the direction of its longitudinal axis at a constant speed. Simultaneously, the web is tensioned by the pulling power acting on the web in the longitudinal direction.

The advantages of the present process are many. By the exact transverse tension effecting no stretching resulting in a dimensional change of the film web, e.g. by clamps gripping the edges of the web, and the longitudinal tension effecting no stretching operation resulting in dimensional change of the film web within the treated areas, the web is in an excellent state of planarity when the embossed lines are applied. As a further advantage, this absolute planarity of the web of material is retained during the further transport of the material, and during the subsequent thermal treatment of the entire web. The application of the embossed lines and the preferred subsequent thermal treatment according to the invention practically force the web to assume a position of optimum planarity. At the same time, the lines applied according to the invention are fixed and the rims of the tiny mounds formed by embossing are subjected to a thermal treatment without distortion.

When the web of material is wound up, the embossed lines applied thereto according to the invention become effective in that the superimposed lines form an annular, or, when viewed as a whole, disc-shaped construction of good supporting capacity within the windings of the roll and create the desired air film between the individual layers, which prevents the layers from lying upon one another and thus protects them from being scratched.

According to the invention, the embossed lines are applied while the web of film is in the state in which the tensioned film may be easily embossed.

The film to be embossed may be brought into the thermal state, in which the tensioned film may be easily embossed, by causing heat of an appropriate temperature to act upon it during a sufficiently long period of time, for example by heating the film with an infrared radiator.

When using base films of polyester, the embossing temperature is, for example, in the range of about 80° to 120° C., whereas in the case of a base film of polypropylene temperatures between 70° and 110° C., for example, may be employed.

The duration of the heat action necessary for bringing the web of film into the ductile state must be individually determined for each case.

The heating time is easily established, however; it depends, among other factors, upon the feed speed of the film in the direction of its longitudinal axis.

In this case, the bearing pressure required for application of the embossed lines may be maintained particularly low.

In a further embodiment of the inventive process, additional embossed lines extending parallel to each other are applied in the longitudinal direction. Such a measure is of advantage when very wide webs are to be wound up, because the additional embossed lines effect a further spacing of the layers of film from each other.

If a wide film web is to be later subdivided into narrower webs, it is preferred to apply a pair of very close embossed lines in a manner such that the center line between the two embossed lines coincides with the area where the division is to take place. The distance between the two embossed lines forming the pair is preferably in the range of from 2 to 50 mm.

Although the process according to the invention may be generally applied to films which are embossable in a thermal state in which the tensioned film may be easily embossed, especially to films of synthetic polymers, such as films of thermoplastic olefin polymers, e.g. polyethylene, polypropylene and the like, or polyesters, e.g. polyethylene terephthalate, or their mixed and copolyesters and further to films of polyvinyl chloride, polystyrene, or polyamides and the like, or films of elastomers, e.g. acrylate or methacrylate based copolymers, it was found to be particularly suitable for films biaxially-stretch-oriented by a stretching operation; in particular stretch-oriented polypropylene, polyamide, polyvinyl chloride or polyethylene terephthalate films which are presently widely used and which have excellent physical properties are preferred for carrying out the inventive process.

The films suitable for carrying out the inventive process are designated as "base flims". Production of the base films is no part of the invention.

These films may be produced, for example, by extruding thermoplastic material through slot dies.

Procesess for biaxially stretching films of thermoplastic materials with dimensional changes of the films are no part of the invention.

Processes for stretch-orienting films of thermoplastic materials are known.

Using stretch-oriented films for the process, the tension applied in the process as defined does not cause further stretch-orientation or dimensional change, respectively, of the starting film web.

In the case of using stretch-oriented films, e.g. polypropylene, polyester or polyamide films, the preferred thermal treatment subsequent to the embossing operation is performed while the web is tensioned in all directions without undergoing a stretching operation effecting dimensional change of the film web—which is also an essential feature of the present invention—is preferably performed at a temperature above the temperature at which the film is produced by extrusion, because in this manner the desired final stage with respect to residual shrinkage, for example, is attained within a very short time.

The preferred thermal treatment may be performed at a constant temperature. In some cases, however, it is advisable to perform the thermal treatment while the temperature rises or drops, in order to impart certain desirable physical characteristics to the finished film.

When using biaxially stretch-oriented base films, the thermal treatment is performed, for example, at a temperature in the range of 100° to 200° C., for example, by appropriately heating the film by means of an infrared radiator. The duration of the heat action must be individually determined for each case. The heating time is easily established, however; it depends, among other factors, upon the feed speed of the film in the direction of its longitudinal axis.

Although the width of the embossed lines is not critical, it is of advantage for the embossed lines to have a width of 1 to 30 mm, preferably 5 to 15 mm, in order to achieve as high as possible a yield of film for further processing.

Likewise, there is no absolutely critical value for the depth of the embossed lines. Preferably, however, the lines have a depth corresponding to 1 to 20 percent, preferably 5 to 10 percent of the thickness of the film.

It may be desirable, in some cases, for the embossed lines to be applied with interruptions, for example, when the web is to be severed after a certain distance. The process of the invention is also suitable for this purpose, because the embossed lines may be applied in such a manner that certain areas remain unembossed and the lines are interrupted.

The present invention also covers a wound roll produced by winding webs of film treated in accordance with the process of the invention. In particular, the present invention covers wound rolls produced by winding webs of film ranging in thickness from 2 to 100 µm, preferably from 10 to 50 µm.

It will be obvious to those skilled in the art that many modifications may be made within the scope of the present invention without departing from the spirit thereof, and the invention includes all such modifications.

What is claimed is:

1. A process for continuously preparing a web of base film composed of synthetic polymer material for a subsequent winding operation, by providing it with embossed lines, preferably one line along each edge or very near each edge of the web, which process comprises embossing the base film while the film is in a thermal state in which the tensioned film may be easily embossed, and is tensioned in all directions without undergoing a stretching operation effecting a dimensional change of the film, and then cooling it, said base film being biaxially oriented by a biaxial stretching operation.

2. A process according to claim 1 in which the film being embossed is subjected to a thermal treatment and then cooled.

3. A process according to claim 1 in which additional embossed lines extending parallel to one another are applied.

4. A process according to claim 3 in which the two additional embossed lines marking a division area are at a distance of about 2 to 40 mm from each other.

5. A process according to claim 1 in which, in the case of a film web which is to be divided before being wound up, pairs composed each of two closely adjacent embossed lines are applied in such a manner that the center line between the embossed lines is in the area where the film is to be later divided.

6. A process according to claim 2 in which the thermal treatment is performed while the temperature rises.

7. A process according to claim 2 in which the thermal treatment is performed while the temperature drops.

8. A process according to claim 1 in which the embossed lines applied have a width of 1 to 30 mm.

9. A process according to claim 1 in which the embossed lines applied have a depth corresponding to 1 to 20 percent of the thickness of the film.

10. A process according to claim 1 in which the embossed lines are not continuous, but are interrupted by unembossed stretches.

11. A process according to claim 1 in which the film is fed in the direction of its longitudinal axis at a constant speed.

* * * * *